(12) United States Patent
McCrea

(10) Patent No.: US 9,820,434 B2
(45) Date of Patent: Nov. 21, 2017

(54) ANGLED STRIPPER FOR A CROSS AUGER ON A CROP HARVESTING HEADER

(71) Applicant: Thomas Edward McCrea, Benito (CA)

(72) Inventor: Thomas Edward McCrea, Benito (CA)

(73) Assignee: AG Shield Ltd., Benito Manitoba, CA (US)

( * ) Notice: Subject to any disclaimer, the term of this patent is extended or adjusted under 35 U.S.C. 154(b) by 56 days.

(21) Appl. No.: 15/007,899

(22) Filed: Jan. 27, 2016

(65) Prior Publication Data

US 2017/0208738 A1    Jul. 27, 2017

(51) Int. Cl.
| | | |
|---|---|---|
| A01D 34/00 | (2006.01) | |
| A01D 34/40 | (2006.01) | |
| A01D 61/00 | (2006.01) | |
| A01D 34/14 | (2006.01) | |
| A01D 101/00 | (2006.01) | |

(52) U.S. Cl.
CPC ............. *A01D 34/40* (2013.01); *A01D 34/14* (2013.01); *A01D 61/002* (2013.01); *A01D 2101/00* (2013.01)

(58) Field of Classification Search
CPC ...... A01D 41/14; A01D 61/008; A01D 41/06; A01D 46/12
USPC ........................................... 56/14.5; 198/635
See application file for complete search history.

(56) References Cited

U.S. PATENT DOCUMENTS

| | | | | |
|---|---|---|---|---|
| 2,270,471 A | * | 1/1942 | Pilcher ................. | A01D 61/008 198/672 |
| 2,301,578 A | * | 11/1942 | Pilcher ................. | A01D 61/008 198/518 |
| 2,311,865 A | * | 2/1943 | Pilcher .................. | B65G 65/22 198/670 |
| 3,402,534 A | * | 9/1968 | Phillips .................. | A01D 43/08 56/12.7 |
| 3,423,915 A | * | 1/1969 | Louthan ................ | A01D 41/14 198/670 |
| 3,451,530 A | * | 6/1969 | Shumway .............. | A01D 41/14 198/570 |
| 3,474,602 A | * | 10/1969 | Molzahn ................ | A01D 43/00 56/14.4 |
| 5,005,343 A | * | 4/1991 | Patterson ............... | A01D 57/20 56/14.4 |

(Continued)

*Primary Examiner* — Arpad Fabian-Kovacs
(74) *Attorney, Agent, or Firm* — Ryan W. Dupuis; Ade & Company Inc.

(57) ABSTRACT

The stripper is a flange member supported on the upright backboard of a crop harvesting header to span a gap between the backboard and a cross auger. The cross auger is supported above a draper on the header to assist in guiding the cut crop being conveyed by the draper to a central rear discharge of the header. The stripper flange member extends forwardly towards the cross auger at an upward inclination so as to be oriented at an angle of greater than 90 relative to a portion of the backboard of the header immediately below the stripper flange member. The stripper flange member is thus better oriented to guide cut crop which rises up the backboard to be deflected forwardly into the cross auger, instead of acting as a stop to accumulate cut crop thereon when the flange member is oriented perpendicularly to the backboard.

5 Claims, 5 Drawing Sheets

(56) References Cited

U.S. PATENT DOCUMENTS

| | | | | |
|---|---|---|---|---|
| 5,557,912 A * | 9/1996 | Voss | ............... | A01D 41/06 |
| | | | | 56/130 |
| 5,784,869 A * | 7/1998 | Rayfield | ............ | A01D 45/021 |
| | | | | 460/114 |
| 6,134,867 A * | 10/2000 | Goering | ............ | A01D 46/12 |
| | | | | 56/34 |
| 7,520,117 B2 * | 4/2009 | Rieck | ............ | A01D 41/12 |
| | | | | 56/62 |

* cited by examiner

ANGLED STRIPPER FOR A CROSS AUGER ON A CROP HARVESTING HEADER

FIELD OF THE INVENTION

The present invention relates to a stripper for use with a cross auger supported above a draper on a crop harvesting header which guides cut crop being conveyed by the draper to a central rear discharge of the header, and more particularly, the present invention relates to a stripper in the form of a flange which projects forwardly from an upright backboard of the header, towards the cross auger, at an upward inclination.

BACKGROUND

Crop harvesting machines, including swathers and combines, generally make use of a crop harvesting header for cutting and gathering the crop to be subsequently i) discharged in a windrow along the ground in the instance of a swather, or ii) separated into grain and chaff in the instance of a combine.

A crop harvesting header generally includes a main frame structure having a length extending generally at right angles to forward movement of the harvester across the ground. Frame members extending forwardly from the main frame structure of the header support a crop receiving table locating a cutter bar across the front end of the table for cutting crop to be deposited onto the table. A backboard extends upwardly from a rear of the table and includes a central discharge opening therein from which gathered cut crop is discharged rearwardly from the header. Side drapers are provided on either side of the central discharge opening to span from the central discharge opening towards opposing ends of the table for conveying cut crop thereon from the respective ends of the header to the central discharge opening.

In certain crop conditions where it is known for cut crop to ride upwardly along the backboard of the header, a cross auger assembly is known to be used in the form of one or more auger sections extending laterally across the header forwardly of the backboard so as to be spaced above the rear end of the side drapers of the table. Although the cross auger is typically provided in close proximity to the front surface of the backboard, in some instances a stripper bar is mounted to project forwardly from the backboard to a forward edge in close proximity to the bottom end of the cross auger assembly to prevent cut crop materials from being pulled upwardly into the gap between the cross auger assembly and the backboard for preventing cut crop materials from being wound about the auger assembly.

Known stripper bar assemblies are generally supported to be oriented substantially horizontally and at right angles to the backboard upon which they are supported. Although this orientation of stripper bar is effective at preventing material from being pulled upwardly behind the cross auger assembly, the perpendicular orientation of the stripper bar relative to the backboard upon which is supported has a tendency to interrupt the upward flow of material into the cross auger and may produce bunching of cut crop material directly below the cross auger assembly.

SUMMARY OF THE INVENTION

According to one aspect of the invention there is provided a stripper assembly for a crop harvesting header of a harvester, the crop harvesting header comprising:

a main frame structure extending in a lateral direction between two ends of the header across a width of the header for movement in a direction generally at right angles to the width across ground including crop to be harvested;

a mounting assembly for carrying the main frame structure on the harvester;

a crop receiving table carried on the main frame structure across the width of the header;

a cutter bar across a front of the table carrying a cutter knife operable for cutting the crop as the header is moved forwardly across the ground for depositing the crop onto the table;

a backboard extending upwardly from a rear of the table across the width of the header and including a rear discharge opening therein for discharging the crop from a central discharge location at the rear of the table;

a first side draper for conveying cut crop along the receiving table from a first end of the header to the central discharge location;

a second side draper for conveying cut crop along the receiving table from a second end of the header to the central discharge location;

a cross auger assembly rotatably carried on the main frame structure to extend in the lateral direction above the rear of the table, forwardly of the backboard and spaced above the first and second side drapers, the cross auger assembly including auger flighting oriented for guiding cut crop from both ends of the header towards the central discharge location as the cross auger assembly is rotated about an auger axis;

the stripper assembly comprising:

a first stripper section carried on the backboard to extend in the lateral direction between the first end of the header and the central discharge location in which the first stripper section protrudes forwardly from the backboard at an upward inclination to a forward edge of the first stripper section which is in proximity to the auger fighting; and a second stripper section carried on the backboard to extend in the lateral direction between the second end of the header and the central discharge location in which the second stripper section protrudes forwardly from the backboard at an upward inclination to a forward edge of the second stripper section which is in proximity to the auger flighting;

wherein the first and second stripper sections are oriented at upward inclination of greater than 90 degrees relative to a portion of the backboard immediately below the stripper sections.

By orienting the stripper sections of the stripper assembly to extend forwardly at an upward inclination of greater than 90 degrees, the stripper sections remain effective at preventing flow of material upwardly behind the cross auger assembly, yet have the added benefit of encouraging a more gradual flow transition of cut crop materials from the backboard area upwardly into the cross auger so that less bunching of cut crop materials occurs directly below the cross auger assembly as compared to prior art cross auger stripper assemblies.

Preferably the first and second stripper sections protrude forwardly from the backboard at an upward inclination between 100 to 130 degrees relative to said portion of the backboard immediately below the stripper sections.

Preferably the forward edge of the first and second stripper sections are greater in elevation than a lowermost edge of the auger flighting.

Preferably the first and second stripper sections are mounted on the backboard so as to be adjustable in height relative to the cross auger assembly.

Preferably the first and second stripper sections are laterally spaced apart from one another at opposing sides of the discharge opening.

According to a second aspect of the present invention there is provided a cross auger kit for a crop harvesting header of a harvester, the crop harvesting header comprising:

a main frame structure extending in a lateral direction between two ends of the header across a width of the header for movement in a direction generally at right angles to the width across ground including crop to be harvested;

a mounting assembly for carrying the main frame structure on the harvester;

a crop receiving table carried on the main frame structure across the width of the header;

a cutter bar across a front of the table carrying a cutter knife operable for cutting the crop as the header is moved forwardly across the ground for depositing the crop onto the table;

a backboard extending upwardly from a rear of the table across the width of the header and including a rear discharge opening therein for discharging the crop from a central discharge location at the rear of the table;

a first side draper for conveying cut crop along the receiving table from a first end of the header to the central discharge location; and a second side draper for conveying cut crop along the receiving table from a second end of the header to the central discharge location;

the cross auger kit comprising:

a cross auger assembly adapted to be rotatably carried on the main frame structure to extend in the lateral direction above the rear of the table, forwardly of the backboard and spaced above the first and second side drapers, the cross auger assembly including auger flighting oriented for guiding cut crop from both ends of the header towards the central discharge location as the cross auger assembly is rotated about an auger axis; and a first stripper section adapted to be carried on the backboard to extend in the lateral direction between the first end of the header and the central discharge location in which the first stripper section protrudes forwardly from the backboard at an upward inclination to a forward edge of the first stripper section which is in proximity to the auger fighting; and a second stripper section adapted to be carried on the backboard to extend in the lateral direction between the second end of the header and the central discharge location in which the second stripper section protrudes forwardly from the backboard at an upward inclination to a forward edge of the second stripper section which is in proximity to the auger flighting;

wherein the first and second stripper sections are adapted to be oriented at upward inclination of greater than 90 degrees relative to a portion of the backboard immediately below the stripper sections.

According to a third aspect of the present invention there is provided a crop harvester comprising:

a harvester frame supported for rolling movement in a forward working direction across ground including crop to be harvested;

a crop harvesting header comprising:

a main frame structure extending in a lateral direction between two ends of the header across a width of the header for movement in the forward working direction generally at right angles to the width;

a mounting assembly for carrying the main frame structure on the harvester frame;

a crop receiving table carried on the main frame structure across the width of the header;

a cutter bar across a front of the table carrying a cutter knife operable for cutting the crop as the header is moved forwardly across the ground for depositing the crop onto the table;

a backboard extending upwardly from a rear of the table across the width of the header and including a rear discharge opening therein for discharging the crop from a central discharge location on the table into a feed opening of the combine harvester;

a first side draper for conveying cut crop along the receiving table from a first end of the header to the central discharge location;

a second side draper for conveying cut crop along the receiving table from a second end of the header to the central discharge location;

a cross auger assembly rotatably carried on the main frame structure to extend in the lateral direction above the rear of the table, forwardly of the backboard and spaced above the first and second side drapers, the cross auger assembly including auger flighting oriented for guiding cut crop from both ends of the header towards the central discharge location as the cross auger assembly is rotated about an auger axis;

a first stripper section carried on the backboard to extend in the lateral direction between the first end of the header and the central discharge location in which the first stripper section protrudes forwardly from the backboard at an upward inclination to a forward edge of the first stripper section which is in proximity to the auger flighting; and a second stripper section carried on the backboard to extend in the lateral direction between the second end of the header and the central discharge location in which the second stripper section protrudes forwardly from the backboard at an upward inclination to a forward edge of the second stripper section which is in proximity to the auger flighting;

wherein the first and second stripper sections are oriented at upward inclination of greater than 90 degrees relative to a portion of the backboard immediately below the stripper sections.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
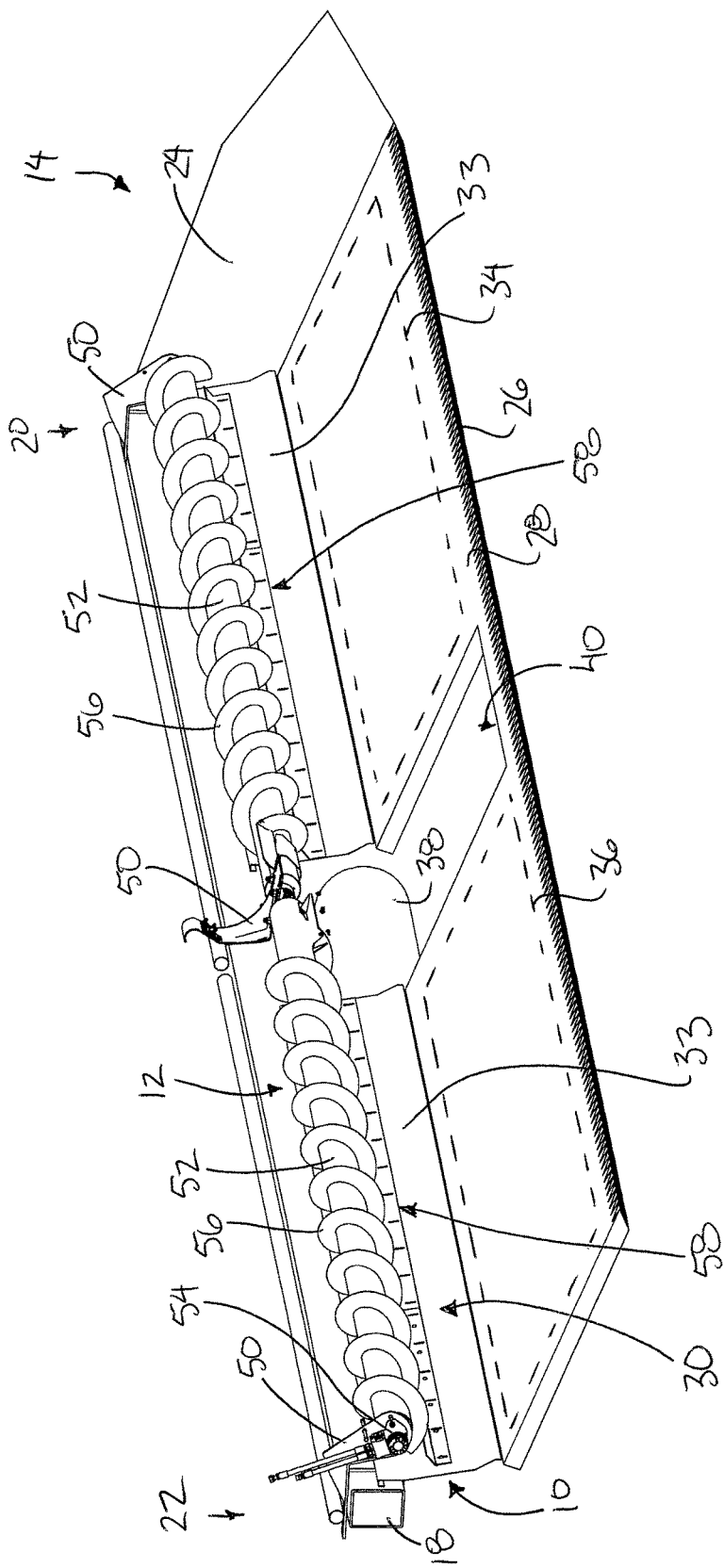
FIG. 1 is a perspective view of the cross auger assembly and stripper assembly shown supported on a crop harvesting header.
Figure 2:
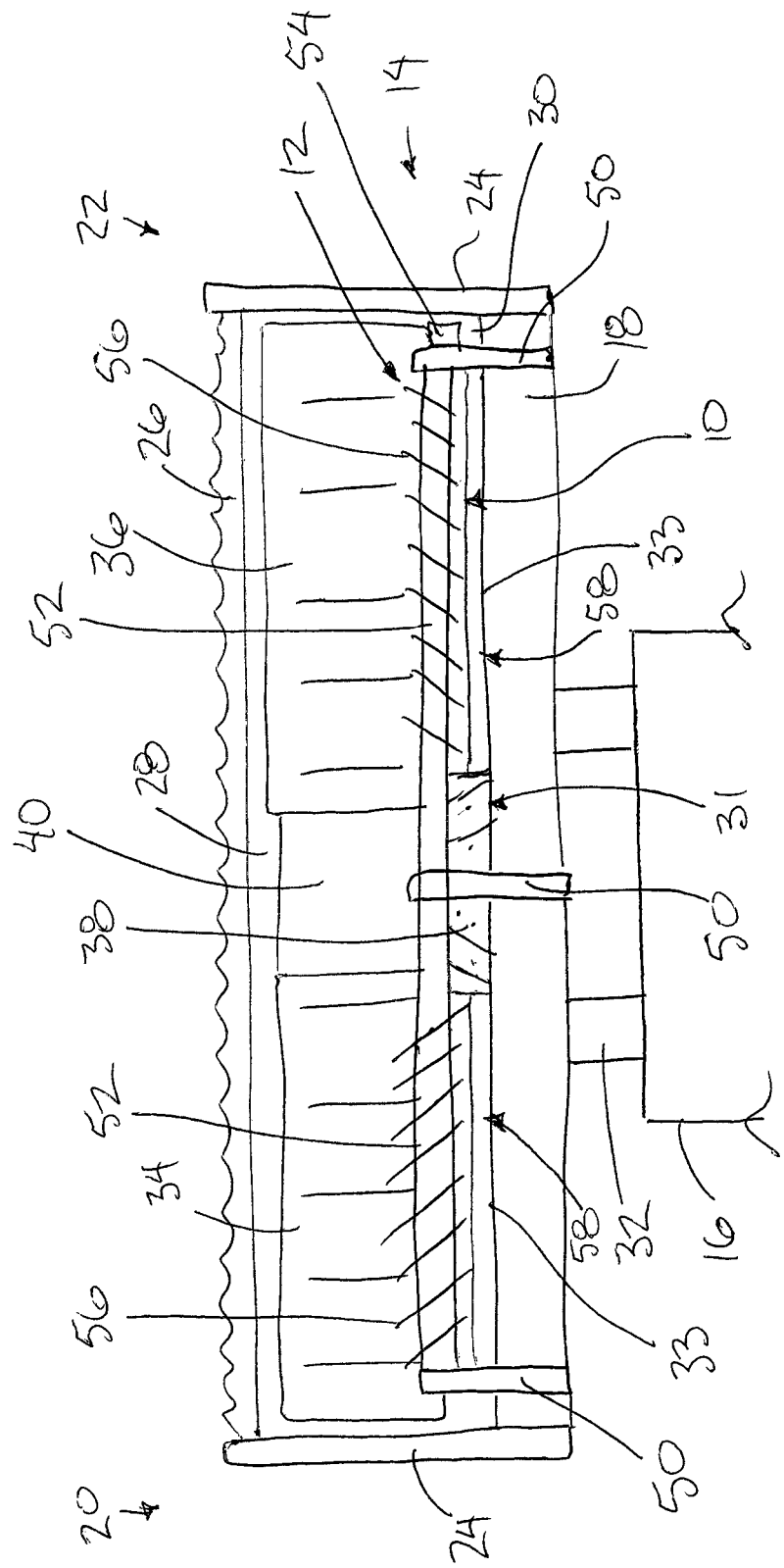
FIG. 2 is a top plan schematic view of cross auger assembly and stripper assembly shown supported on the crop harvesting header according to FIG. 1.
Figure 3:
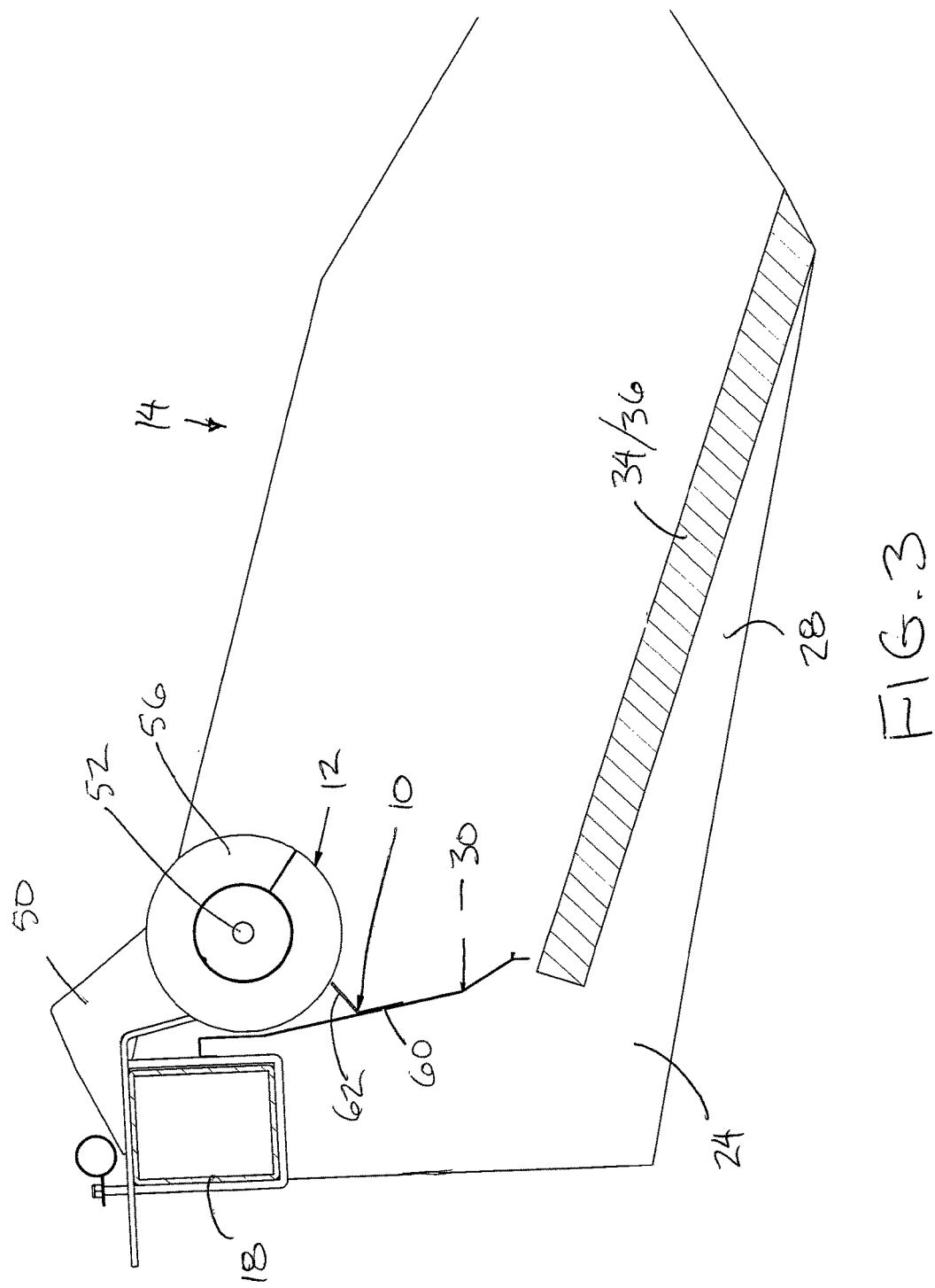
FIG. 3 is a schematic end elevational view of the stripper assembly relative to the crop harvesting header.
Figure 4:
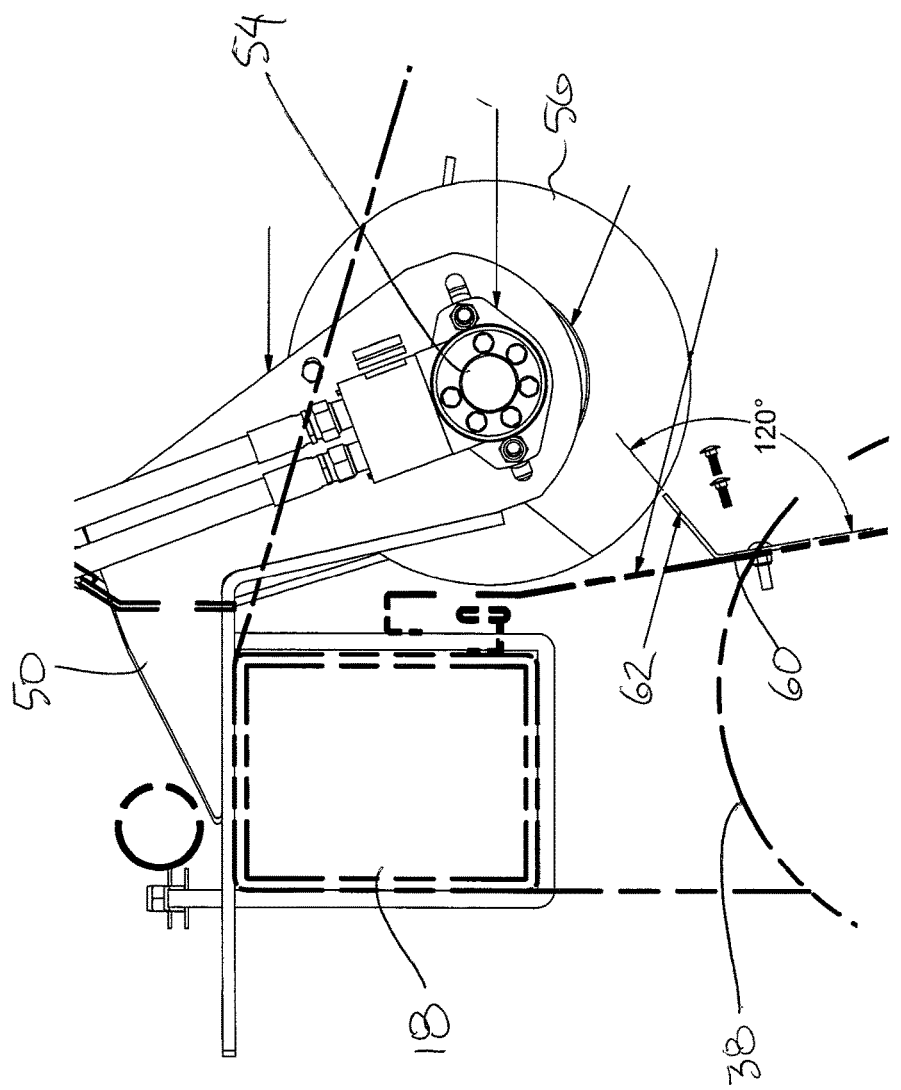
FIG. 4 is an end elevational view of the stripper assembly and cross auger assembly including the drive motor of the cross auger assembly.
Figure 5:
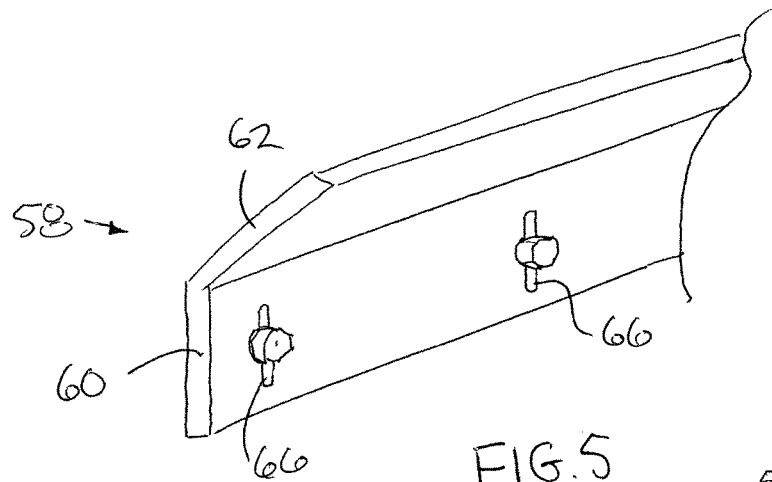
FIG. 5 is a perspective view of a portion of the stripper assembly.
Figure 6:
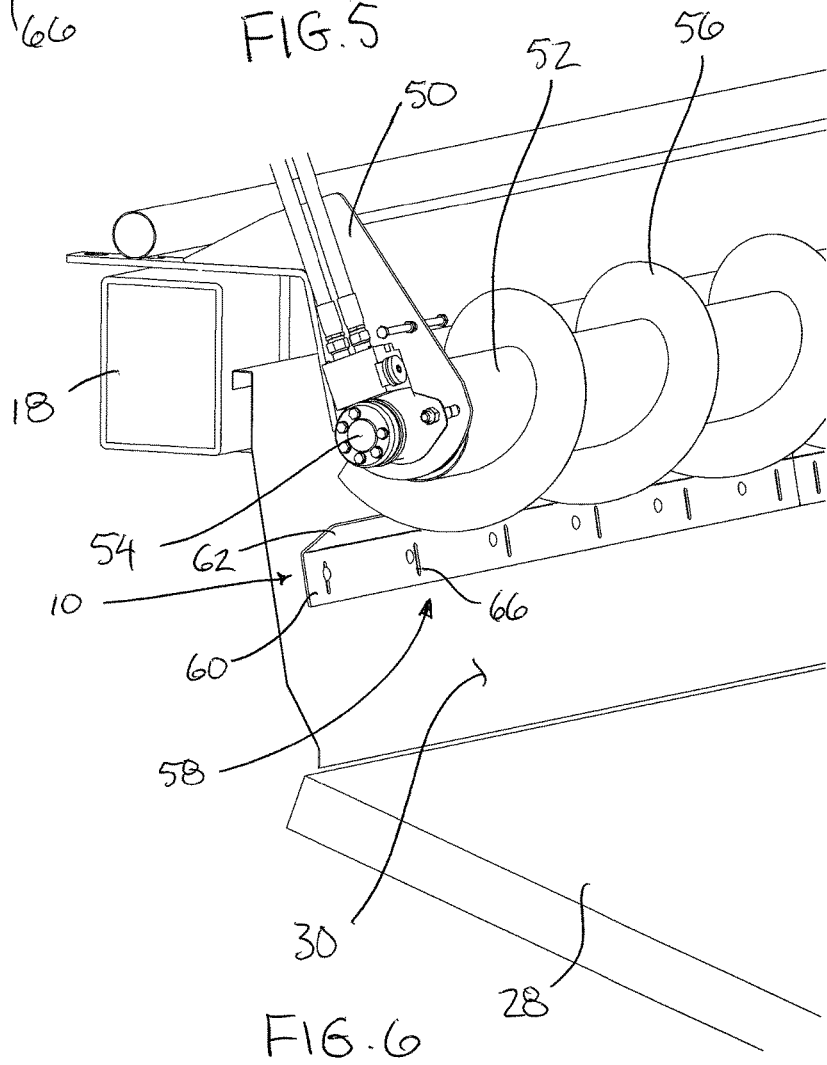
FIG. 6 is an enlarged perspective view of one end of the header supporting the cross auger assembly and stripper assembly thereon.

Referring to the accompanying figures there is illustrated a stripper assembly generally indicated by reference numeral 10. The stripper assembly 10 is particularly suited for use with a cross auger assembly 12 on a crop harvesting header 14 for a harvester machine 16.

The harvester 16 may comprise a swather in which crop is cut and gathered centrally for discharging rearwardly into a windrow on the ground as the harvester is advanced in a forward working direction across the ground. Alternatively the harvester 16 may comprise a harvester combine for cutting crop, gathering the crop, and separating the grain from the chaff. In both instances the harvester 16 comprises a frame supported on wheels for rolling movement in a forward working direction over ground including crop to be harvested thereon.

The crop harvesting header 14 typically comprises a main frame structure in the form of a main beam 18 extending in a lateral direction between a first end 20 and an opposing second end 22 so as to span the full width of the header frame in a direction which is perpendicular to the forward working direction of the harvester. In the illustrated embodiment of the main beam comprises a steel tube of rectangular cross-section.

The frame of the header also includes a plurality of frame members 24 extending downwardly and forwardly from the main beam 18 at both ends of the main beam, and at one or more intermediate locations between the opposing ends. The frame members 24 support a crop receiving table 28 extending across the width of the header at a location which is generally downwardly and protrudes forwardly relative to the main beam 18 thereabove.

A backboard 30 extends upwardly from a rear of the table towards the main beam at the top end thereof. The backboard 30 defines a central discharge opening 31 below the main beam 18 at the rear of the table from which collected cut crop material is discharged from the header into a windrow in the instance of a swather, or into the feeder housing of the combine in the instance of a combine. The backboard 30 is thus formed in two sections 33 in which each section is a rigid sheet extending in the lateral direction from a respective the end of the header to the central discharge opening 31, and extending upwardly from the rear edge of the table to the main beam at the top end of the sheet. The sheets are oriented to extend upwardly at a slight rearward angle.

A mounting assembly 32 is provided at the rear of the main frame structure for carrying the main frame structure of the header on the harvester 16 in a conventional manner.

A cutter bar 26 is supported across the front end of the frame members 24 at the front end of the table 28. The cutter bar 26 comprises sickle knives supported for reciprocating movement in the lateral direction to cut crop relative to sickle guards supported on the frame of the header in a conventional manner.

The cut crop materials are primarily transported from opposing ends of the header towards the central discharge opening by a draper assembly comprising a first side draper 34 and a second side draper 36. The first side draper includes an outer guide roller adjacent the first end of the header, an inner guide roller in proximity to the central discharge, and a continuous canvas belt rotatably supported to extend about the inner and outer guide rollers such that an upper run of the belt is displaced inwardly from the outer end towards the central discharge location for conveying cut crop materials laid thereon towards the central discharge location. The second side draper 36 similarly includes an outer guide roller adjacent the second end of the header, an inner guide roller in proximity to the central discharge, and a continuous canvas belt rotatably supported to extend about the inner and outer guide rollers such that the upper run of the belt is displaced inwardly from the outer end of the header towards the central discharge location for conveying cut crop materials laid thereon towards the central discharge location.

In some instances the header may further include a rotary feed member 38 in the form of a drum rotatably supported about an axis oriented in the lateral direction such that the drum is positioned within the discharge opening between the two sections of the backboard 30. The rotary feed member 38 includes helical flighting and fingers thereon suitably oriented to assist in guiding cut crop material from the central discharge location of the table rearwardly through the discharge opening at the rear of the table in a conventional manner.

The header may also include a central draper 40 spanning between the inner ends of the first and second side drapers to assist in conveying material deposited thereon from the first and second side drapers rearwardly towards the rotary feed member 38. The central draper includes a forward guide roller and a rearward guide roller and a continuous run of canvas supported rotatably about the guide rollers such that an upper run of the canvas spans between at a location below the inner ends of the side drapers to convey deposited crop materials thereon rearwardly.

The header generally also includes a reel (not shown) having a frame generally in the shape of a drum having a horizontal axis spanning in the lateral direction across the width of the header at a location above the drapers, and including fingers thereon rotated with the drum shaped frame for gathering crop materials into the cutter bar and for subsequent deposit on the drapers.

The stripper assembly 10 and the cross auger assembly 12 are typically provided together as a kit for retrofit installation onto an existing crop harvesting header; however, features of the stripper assembly and the cross auger assembly 12 can also be readily incorporated into the manufacture of new crop harvesting headers.

In the illustrated embodiment, the cross auger assembly 12 comprises a plurality of support arms 50 mounted at respective rear ends on the main beam 18 of the harvester to extend generally downwardly and forwardly therefrom to respective forward ends which are positioned at a location spaced above the rear end of the table, forwardly of the backboard, in proximity to the top end of the backboard. Typically to support arms 50 are provided at the opposing first and second ends of the header and an additional support arm 50 is located at an intermediate location which is laterally centred over the central discharge opening. In this instance an auger shaft of the cross auger assembly 12 is formed in two sections 52 such that each section spans between a respective one of the outer arms at a respective end of the header towards the intermediate support arm 50 at the central discharge location.

In alternative arrangements, the auger shaft of the cross auger assembly may comprise more auger sections, particularly for flexible headers having multiple sections supported for floating movement relative to one another. In this instance multiple intermediate support arms 50 may be provided such that a single support arm can be provided at the junction between each adjacent pair of auger sections.

The auger shaft sections 52 are all connected in series with one another so as to be rotatable together about a common axis of rotation extending in the lateral direction across the width of the header. The auger shaft sections are rotatably supported on the forward ends of the support arms 50 by suitable bearings in a conventional manner.

A hydraulic motor 54 is mounted at the forward end of one of the outer support arms 50 so as to be operatively connected to one end of the interconnected auger shaft sections 52 to collectively drive all of the auger sections for rotation about the long axis thereof relative to the frame of the header. The auger shaft sections 52 are rotated such that they are displaced downwardly at the leading side thereof and they are displaced upwardly at the rear side thereof closest to the backboard.

Each auger shaft section 52 is provided with helical auger flighting 56 which is oriented for guiding cut crop materials laterally inwardly towards the central discharge location as the auger sections are rotated together.

The stripper assembly is comprised of a plurality of stripper sections 58 mounted to span between the backboard and the flighting of the cross auger assembly in proximity to the bottom end of the cross auger assembly to resist cut crop material from being directed upwardly into the gap between the cross auger assembly and the backboard. In the illustrated embodiment two stripper sections 58 are provided such that each stripper section extends laterally alongside a respective auger shaft section 52 from a respective outer end of the header to the central discharge location. The two stripper sections 58 thus remain laterally spaced apart from one another at opposing sides of the central discharge opening in the backboard.

Each stripper section comprises a unitary rigid member formed of a mounting flange 60 for mounting flat against the leading face of the backboard, and a stripper flange 62 protruding upwardly and forwardly from the top edge of the mounting flange in the mounted position on the header. In this manner, each stripper flange defines a respective upper portion of the backboard immediately above the stripper flange and a respective lower portion of the backboard immediately below the stripper flange. In the illustrated embodiment, each stripper flange is oriented at an interior angle of approximately 120° relative to the respective mounting flange; however, any suitable slope within a preferred range of 100 to 130°, or within a broader range of 90 to 150° would be effective. The interior angle of 120° of each stripper flange is defined herein as being between a bottom side of the stripper flange and the respective lower portion of the backboard immediately below the stripper flange. An interior angle of the stripper flange relative to the lower portion of the backboard immediately below the stripper flange which is greater than 90° functions better than prior art devices for guiding cut crop materials riding upwardly along the rear backboard wall of the header to be readily deflected into the cross auger assembly rather than bunching up below the stripper assembly.

The mounting flanges 60 of the stripper sections are mounted against the backboard by providing a plurality of mounting apertures 66 at laterally spaced apart positions thereon. Each mounting aperture 66 is elongated in an upright direction perpendicular to the lateral direction of length of the stripper sections and is suitable for receiving a threaded fastener therethrough which fastens the mounting flanges to the leading face of the backboard. The elongated slot shape of each mounting aperture readily permits the height of the stripper sections to be adjusted relative to the header frame, and relative to the cross auger assembly supported on the header frame.

The mounting flanges are supported at a suitable elevation such that the stripper flanges extend at an upward and forward inclination to respective forward edges of the stripper flanges which are in close proximity to the edge of the auger flighting of the cross auger assembly. The top edge of the mounting flanges is near in elevation to the lowermost edge of the auger flighting such that the upward and forward inclination of the stripper flanges results in the forward edges thereof being in close proximity to a portion of the auger flighting which is rearward of the axis of rotation of the cross auger assembly and which is spaced above in elevation the lowermost edge of the auger flighting.

Since various modifications can be made in my invention as herein above described, it is intended that all matter contained in the accompanying specification shall be interpreted as illustrative only and not in a limiting sense.

The invention claimed is:

1. A crop harvesting header comprising:
   a main frame structure extending in a lateral direction between two ends of the header across a width of the header;
   a mounting assembly for carrying the main frame structure on a harvester by which the header is transported in movement in a forward direction generally at right angles to the width across ground including a crop to be harvested;
   a crop receiving table carried on the main frame structure across the width of the header;
   a cutter bar across a front of the table carrying a sickle knife operable for cutting the crop as the header is moved forwardly across the ground for depositing the crop onto the table;
   a backboard extending upwardly from a rear of the table across the width of the header;
   a rear discharge opening in the backboard at the rear of the table at a central discharge location between the two ends of the header through which the crop from the header is discharged;
   a first side draper extending along the receiving table from a first end of the header to the central discharge location for conveying cut crop from the first end of the header to the rear discharge opening; and
   a second side draper extending along the receiving table from a second end of the header to the central discharge location for conveying cut crop from the second end of the header to the rear discharge opening;
   a cross auger assembly rotatably carried on the main frame structure to extend in the lateral direction above the rear of the table, forwardly of the backboard and spaced above the first and second side drapers;
   the cross auger assembly including auger flighting acting to guide cut crop from both ends of the header towards the central discharge location as the cross auger assembly is rotated about an auger axis;
   a first stripper flange carried on the backboard to extend in the lateral direction between the first end of the header and the central discharge location so as to define a first lower portion of the backboard immediately below the first stripper flange;
   the first stripper flange protruding forwardly from the backboard at an upward inclination to a forward edge of the first stripper flange which is in proximity to the auger flighting; and a second stripper flange carried on the backboard to extend in the lateral direction between the second end of the header and the central discharge location so as to define a second lower portion of the backboard immediately below the second stripper flange;

the second stripper flange protruding forwardly from the backboard at an upward inclination to a forward edge of the second stripper flange which is in proximity to the auger flighting;

a first interior angle between a bottom side of the first stripper flange and the first lower portion of the backboard being greater than 90 degrees; and a second interior angle between a bottom side of the second stripper flange and the second lower portion of the backboard being greater than 90 degrees.

2. The cross harvesting header according to claim 1 wherein each of the first and second interior anglesis between 100 and 130 degrees.

3. The cross harvesting header according to claim 1 wherein the forward edge of each of the first and second stripper flanges is greater in elevation than a lowermost edge of the auger flighting.

4. The cross harvesting header according to claim 1 wherein the first and second stripper flanges are adjustable in height relative to the backboard and the cross auger assembly.

5. The cross harvesting header according to claim 1 wherein the first and second stripper flanges are laterally spaced apart from one another at opposing sides of the discharge opening.

* * * * *